(12) United States Patent
Fukawatase

(10) Patent No.: US 8,690,187 B2
(45) Date of Patent: Apr. 8, 2014

(54) VEHICLE SAFETY DEVICE

(71) Applicant: Osamu Fukawatase, Miyoshi (JP)

(72) Inventor: Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/016,548

(22) Filed: Sep. 3, 2013

(65) Prior Publication Data

US 2014/0062069 A1    Mar. 6, 2014

(30) Foreign Application Priority Data

Sep. 5, 2012  (JP) .................. 2012-195309

(51) Int. Cl.
*B60R 21/207* (2006.01)

(52) U.S. Cl.
USPC ...................... 280/730.2; 280/733; 280/743.2

(58) Field of Classification Search
USPC .......................... 280/730.1, 730.2, 733, 743.2
See application file for complete search history.

(56) References Cited

U.S. PATENT DOCUMENTS

| | | | |
|---|---|---|---|
| 5,636,862 A * | 6/1997 | Cheung et al. | 280/730.2 |
| 5,782,529 A * | 7/1998 | Miller et al. | 297/216.13 |
| 6,695,342 B2 * | 2/2004 | Tanase et al. | 280/730.2 |
| 7,431,331 B2 * | 10/2008 | Siemiantkowski | 280/730.1 |
| 2005/0236819 A1 | 10/2005 | Riedel et al. | |
| 2006/0119082 A1 | 6/2006 | Peng et al. | |
| 2006/0119083 A1 | 6/2006 | Peng et al. | |
| 2006/0260027 A1 * | 11/2006 | Rhodes et al. | 2/421 |
| 2012/0091695 A1 * | 4/2012 | Richez et al. | 280/729 |

FOREIGN PATENT DOCUMENTS

| | | |
|---|---|---|
| JP | A-2005-306377 | 11/2005 |
| WO | WO 01/49535 A1 | 7/2001 |

* cited by examiner

*Primary Examiner* — Paul N Dickson
*Assistant Examiner* — Darlene P Condra
(74) *Attorney, Agent, or Firm* — Oliff PLC

(57) ABSTRACT

A vehicle safety device includes a vehicle seat, an inflator, a far-side airbag and a tension tether. The far-side airbag is configured to inflate and deploy forward and upward with respect to the vehicle seat from a seatback inner side portion by a gas being supplied into the far-side airbag. The far-side airbag protrudes higher than a headrest when the far-side airbag is in an inflated and deployed state. The tension tether extends upward from a predetermined portion of an upper end portion of a seatback frame and hooks around the headrest from behind the vehicle seat in the inflated and deployed state. The tension tether extends from an upper surface of the headrest toward an upper surface of the far-side airbag, and further extends toward the seatback frame on a vehicle inside with respect to the far-side airbag in the inflated and deployed state.

15 Claims, 8 Drawing Sheets

VEHICLE SAFETY DEVICE

INCORPORATION BY REFERENCE

The disclosure of Japanese Patent Application No. 2012-195309 filed on Sep. 5, 2012 including the specification, drawings and abstract is incorporated herein by reference in its entirety.

BACKGROUND OF THE INVENTION

1. Field of the Invention

The invention relates to vehicle safety device that protects, by a far-side airbag, a vehicle occupant who is on a side opposite a collision side, when a vehicle is involved in a side collision.

2. Description of Related Art

A safety device described in Japanese Patent Application Publication No. 2005-306377 (JP 2005-306377 A) is mounted on a side portion on a vehicle inside of a seatback of a vehicle seat. The safety device is provided with an airbag (a far-side airbag) that inflates and deploys next to (to a side of) a vehicle occupant by gas generated by a gas generator. One end of a tension strap is connected to a front end of this far-side airbag. Also, the other end of the tension strap is connected to a center portion, in a seat width direction, of a front portion of the seatback. This tension strap supports the far-side airbag by receiving tension when the vehicle occupant strikes the far-side airbag due to the impact of a side collision. As a result, lateral (sideways) movement of the far-side airbag is prevented or reduced.

In a vehicle safety device such as that described above, the tension strap expands between the front end of the far-side airbag and the center portion, in the seat width direction, of the front portion of the seatback, by the far-side airbag inflating and deploying. If at this time the vehicle occupant that is leaning against the seatback strikes the tension strap, pull force (tensile force) from the tension strap toward the inside in the seat width direction will be applied to the front end of the far-side airbag. In such a case, the deployment direction of the far-side airbag will end up bending toward the inside in the seat width direction, and as a result, the occupant restraint performance by the far-side airbag may be adversely affected.

SUMMARY OF THE INVENTION

The invention thus provides a vehicle safety device capable of providing good occupant restraint performance by a far-side airbag.

One aspect of the invention relates to a vehicle safety device provided with a vehicle seat, an inflator, a far-side airbag, and a tension tether. In the vehicle seat, a headrest is formed integrated with or separate from a seatback. The inflator is provided in the vehicle seat and generates gas by activating. The far-side airbag is arranged in a seatback inner side portion that is positioned on a vehicle inside in a vehicle width direction. The far-side airbag is configured to inflate and deploy forward and upward with respect to the vehicle seat from the seatback inner side portion by the gas being supplied into the far-side airbag. Also, the far-side airbag protrudes higher than the headrest when the far-side airbag is in an inflated and deployed state in which the far-side airbag is inflated. The tension tether is formed in a long shape and connected to the far-side airbag. A first longitudinal end portion and a second longitudinal end portion of the tension tether is connected to a seatback frame provided in the seatback. The tension tether extends upward from a predetermined portion of an upper end portion of the seatback frame and hooking around the headrest from behind the vehicle seat when the far-side airbag is in the inflated and deployed state. The predetermined portion is positioned farther on a vehicle outside in the vehicle width direction than the headrest. The tension tether extends from an upper surface of the headrest toward an upper surface of the far-side airbag, and further extends toward the seatback frame on a vehicle inside, in the vehicle width direction, with respect to the far-side airbag, when the far-side airbag is in the inflated and deployed state.

With this aspect of the invention, when a side collision of the vehicle is detected, for example, the inflator activates and gas is generated. This gas is supplied into the far-side airbag provided on the seatback inner side portion. As a result, the far-side airbag inflates and deploys forward and upward with respect to the seat from the seatback inner side portion, and protrudes higher than the headrest.

The first longitudinal end portion and the second longitudinal end portion of the tension tether that is connected to the seatback frame are connected to this far-side airbag. When the far-side airbag is in the inflated and deployed state, this tension tether extends upward from the predetermined portion of the upper end portion of the seatback frame and hooks around the headrest from behind the seat, and extends from the upper surface of the headrest toward the upper surface of the far-side airbag, and further extends toward the seatback frame through the vehicle inside with respect to the far-side airbag. This predetermined portion is positioned farther to the vehicle outside in the vehicle width direction than the headrest.

Therefore, when an occupant seated in the vehicle seat strikes the far-side airbag due to the impact of a side collision, a portion of the tension tether catches on the headrest and the far-side airbag is supported from the vehicle inside by the tension tether. As a result, the far-side airbag is inhibited from moving toward the vehicle inside by the load from the occupant. Moreover, the far-side airbag that protrudes higher than the headrest is inhibited from moving toward the vehicle inside by the tension tether, so the head of the occupant is effectively inhibited from moving toward the vehicle inside by the far-side airbag.

Also, the tension tether extends as described above when the far-side airbag is in the inflated and deployed state, so the occupant will not contact the tension tether when the far-side airbag inflates and deploys. As a result, it is possible to prevent the deployment direction of the far-side airbag from unexpectedly bending due to pull force from the tension tether. Thus, the deployment direction of the far-side airbag can be stabilized, and as a result, good occupant restraint performance is able to be provided by the far-side airbag.

In the aspect of the invention, a rear surface of the headrest may be inclined or curved toward a front of the vehicle seat higher up. Also, the tension tether may be configured to slide upward along the rear surface of the headrest when the far-side airbag inflates and deploys.

In the structure described above, the tension tether that is connected to the far-side airbag slides upward along the rear surface of the headrest when the far-side airbag protrudes higher than the headrest as a result of inflating and deploying. The rear surface of the headrest is inclined or curved toward the front of the seat higher up. Therefore, the tension tether is able smoothly slide up to the upper surface of the headrest.

In the aspect of the invention, when the far-side airbag is in the inflated and deployed state, a portion of the tension tether that is positioned on the vehicle inside, in the vehicle width direction, with respect to the far-side airbag may pass through a position that overlaps with a center of a shoulder of an occupant seated in the vehicle seat or a position that is farther in front of the vehicle seat than the center, when viewed from the vehicle width direction.

In the structure described above, the tension tether is connected to the far-side airbag as described above, so a shoulder of an occupant that strikes the far-side airbag due to an impact of a side collision is able to be well supported by the tension tether via the far-side airbag. As a result, the head of the occupant is able to be effectively inhibited from moving toward the vehicle inside.

In the aspect of the invention, the first longitudinal end portion may be fixed to the predetermined portion. Also, the second longitudinal end portion may be fixed to the inflator and the seatback frame at the seatback inner side portion.

In the structure described above, the tension tether is such that the first longitudinal end portion is fixed to the predetermined portion of the upper end portion of the seatback frame, that is farther to the vehicle outside than the headrest. Also, when the far-side airbag is in the inflated and deployed state, the tension tether extends upward from the fixed portion and hooks around the headrest from behind the seat, and extends from the upper surface of the headrest toward the upper surface of the far-side airbag. Further, the tension tether passes to the vehicle inside with respect to the far-side airbag and extends toward the seatback inner side portion. The second longitudinal end portion of this tension tether is fixed to the inflator and the seatback frame. An existing part for fixing the inflator to the seatback frame may be used for this fixing, so the tension tether is able to be easily fixed to the seatback frame by a simple structure.

In the aspect of the invention, the first longitudinal end portion may be fixed to the predetermined portion. Also, the second longitudinal end portion may be fixed to a lower end portion of the seatback frame at the seatback inner side portion.

In the structure described above, the tension tether is such that the first longitudinal end portion is fixed to a predetermined portion of the upper end portion of the seatback frame, that is farther to the vehicle outside of the headrest. Also, when the far-side airbag is in the inflated and deployed state, the tension tether extends upward from the fixed portion and hooks around the headrest from behind the seat, and extends from the upper surface of the headrest toward the upper surface of the far-side airbag. Further, the tension tether passes to the vehicle inside with respect to the far-side airbag and extends toward the seatback inner side portion. The second longitudinal end portion of this tension tether is fixed to the lower end portion of the seatback frame, at the seatback inner side portion. Therefore, a longitudinal main portion of the tension tether extends vertically between the lower end portion and a side surface positioned on the inside in the vehicle width direction (i.e., the inside surface) of the far-side airbag. The longitudinal main portion is positioned between the first longitudinal end portion and the second longitudinal end portion. As a result, the head, shoulders, and chest of an occupant, for example, are supported from the vehicle inside by the far-side airbag. Also, the abdominal region and the lumbar region of the occupant are supported from the vehicle inside by the longitudinal main portion of the tension tether. As a result, the upper body of the occupant is able to be effectively inhibited from moving toward the vehicle inside, so the head of the occupant is able to be even more effectively inhibited from moving toward the vehicle inside.

In the aspect of the invention, the first longitudinal end portion may be fixed to the predetermined portion. Also the longitudinal main portion of the tension tether may extend toward a rear of the vehicle seat from the vehicle inside with respect to the far-side airbag in the vehicle width direction, and be hooked around a rear surface of the seatback frame, and extend toward a vehicle outside in the vehicle width direction. Furthermore, the second longitudinal end portion may be fixed to the first longitudinal end portion and the seatback frame.

In the structure described above, the first longitudinal end portion of the tension tether is fixed to a predetermined portion of the upper end portion of the seatback frame, that is farther to the vehicle outside than the headrest. Also, when the far-side airbag is in the inflated and deployed state, the tension tether extends upward from the fixed portion and hooks around the headrest from behind the seat, and extends from the upper surface of the headrest toward the upper surface of the far-side airbag. Further, the tension tether passes to the vehicle inside with respect to the far-side airbag and extends toward the seatback inner side portion. The longitudinal main portion of this tension tether extends to the rear of the seat from the vehicle inside of the far-side airbag, and is hooked around the rear surface of the seatback frame and extends toward the vehicle outside. The second longitudinal end portion of the tension tether is fixed to the first longitudinal end portion of the tension tether and the seatback frame. Therefore, the tension that acts on the tension tether when an occupant strikes the far-side airbag is able to be supported by not only the fixed portion of the seatback frame, but also the portion of the rear surface of the seatback frame that the tension tether is hooked around. Accordingly, the strength of the seatback frame is able to be effectively utilized, so the far-side airbag is able to be well supported via the tension tether. As a result, the upper body of the occupant is able to be effectively inhibited from moving toward the vehicle inside, so the head of the occupant is able to be even more effectively inhibited from moving toward the vehicle inside.

In the aspect of the invention, before the far-side airbag inflates and deploys, the far-side airbag and the tension tether may be covered by a cover of the seatback. Also, a first tear sewn portion along a front edge portion of the seatback inner side portion and a second tear sewn portion along a rear edge portion of an upper end portion of the seatback may be provided on the cover. The first tear sewn portion is configured to tear by an inflation pressure of the far-side airbag when the far-side airbag inflates and deploys. Also, the second tear sewn portion is configured to tear by force from the tension tether when the far-side airbag inflates and deploys.

In this structure, the tension tether that is normally covered by the cover of the seatback is configured to be pulled out toward the outside of the cover by the tearing of the second tear sewn portion. This second tear sewn portion is provided along the seat rear edge portion of the upper end portion of the seatback, so the tension tether that is pulled out in this way is able to be better induced toward the rear surface of the headrest.

As described above, the vehicle safety device according to the invention makes it possible to provide good occupant restraint performance by a far-side airbag.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
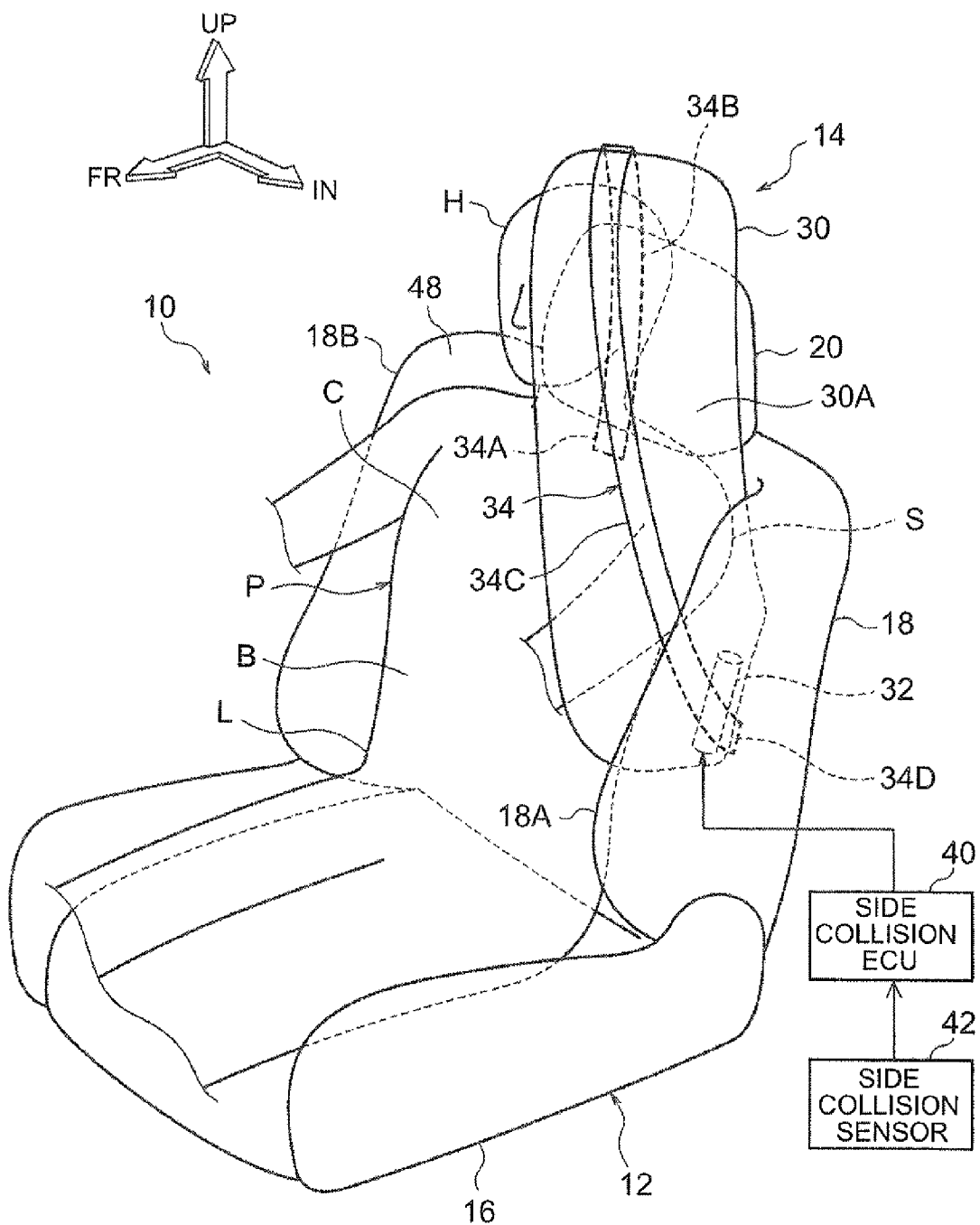
FIG. 1 is a perspective view of a vehicle safety device according to a first example embodiment of the invention.

A vehicle safety device 10 according to a first example embodiment of the invention will be described with reference to FIGS. 1 to 6. In the drawings, arrow FR indicates a forward (i.e., advancing) direction with respect to a vehicle, arrow UP indicates an upward direction with respect to the vehicle, and arrow IN indicates an inside direction in a vehicle width direction. Hereinafter, in descriptions regarding the front-rear and up-down directions, unless otherwise specified, front and rear are in the vehicle longitudinal (i.e., front-rear) direction, and up and down are in the vehicle vertical (up-down) direction.

As shown in FIGS. 1 to 4, the vehicle safety device 10 according to the first example embodiment includes a vehicle seat 12 (here, a driver's seat in a right-hand drive vehicle), and a far-side airbag device 14. The vehicle seat 12 includes a seat cushion 16 upon which an occupant P sits, a seatback 18 that is connected to a rear end portion of the seat cushion 16 and serves as a backrest for the occupant P, and a headrest 20 that is connected to an upper end portion of the seatback 18 and supports a head H of the occupant P. A rear surface 20A of the headrest 20 is curved toward the front of the seat higher up.

In this example embodiment, the front-rear (longitudinal) direction, left-right (lateral) direction, and up-down (vertical) direction of the vehicle seat 12 respectively match the front-rear (longitudinal) direction, the left-right (lateral) direction, and the up-down (vertical) direction of the vehicle. Also, in FIGS. 1 to 4, a crash test dummy P, instead of an actual person, is seated in the vehicle seat 12. This dummy P may be a World Side Impact Dummy: WorldSID, for example. Hereinafter, the dummy P will be referred to as "occupant P" to facilitate understanding of the description.

Figure 3:
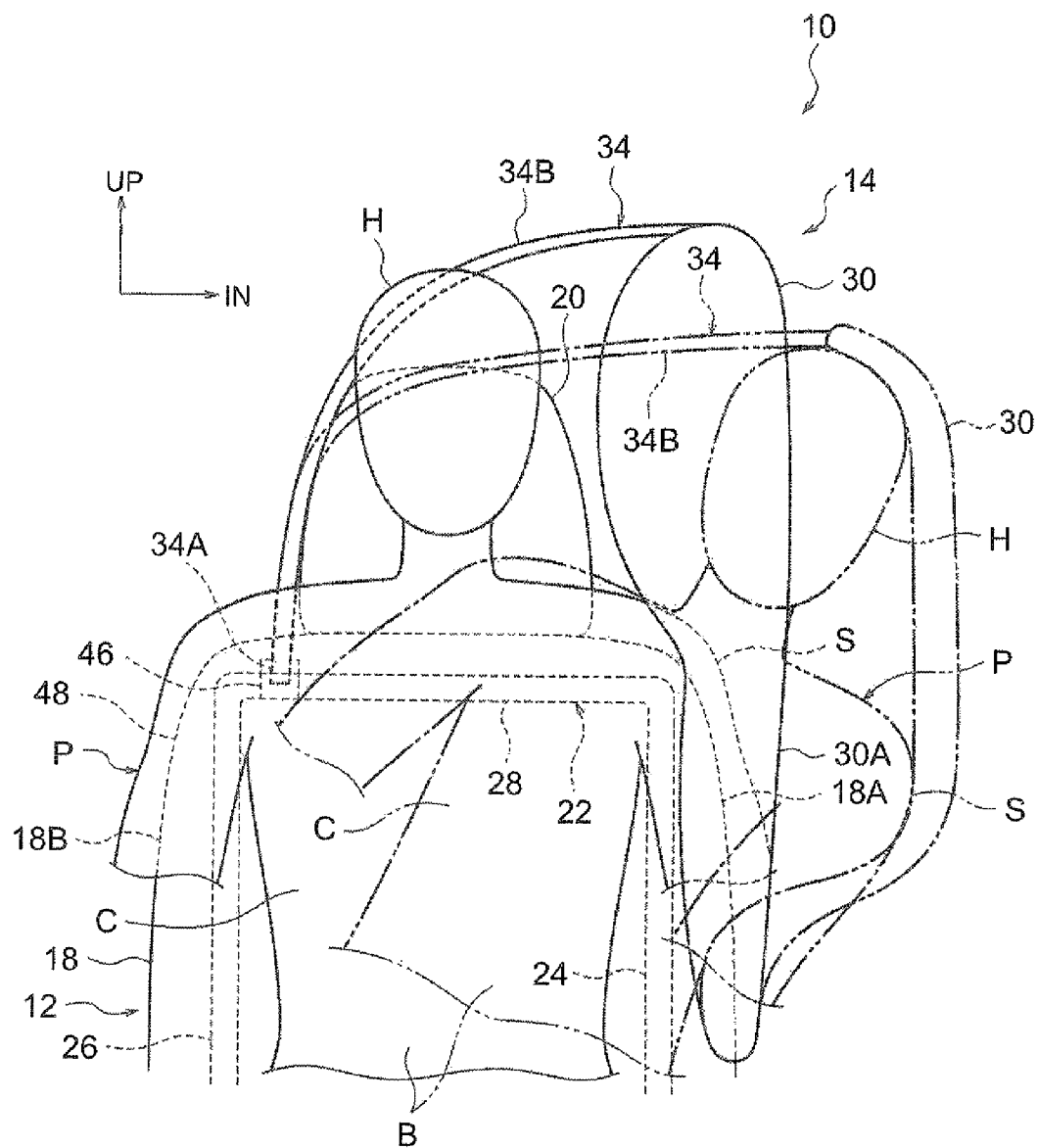
FIG. 3 is a front view of the structure of the main portions of the vehicle safety device according to the first example embodiment.
Figure 4:
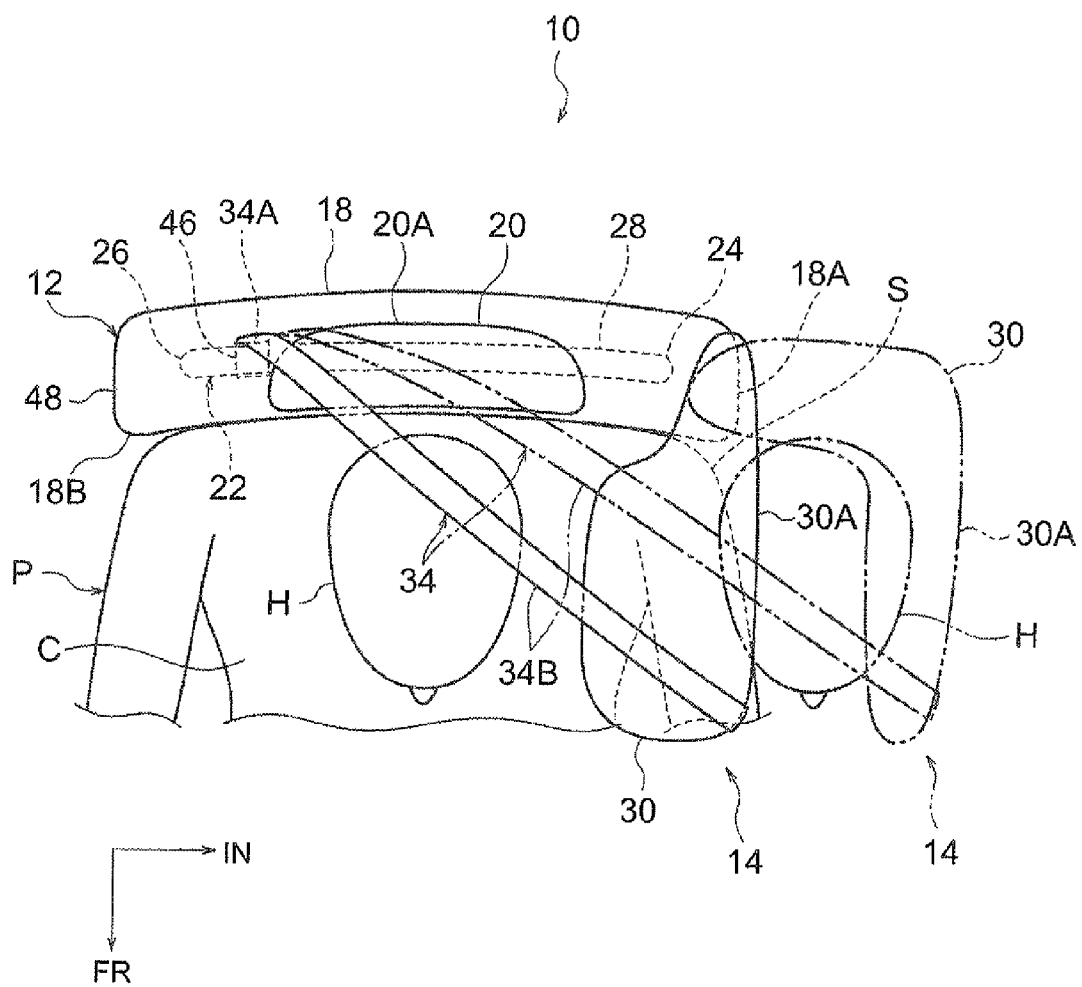
FIG. 4 is a plan view of the structure of the main portions of the vehicle safety device according to the first example embodiment.

As shown in FIG. 3, the seatback 18 includes a seatback frame 22 that is a frame member. This seatback frame 22 includes an inner side frame 24, an outer side frame 26, and an upper frame 28, and is formed in a generally inverted U-shape when viewed from the seat longitudinal direction. The inner side frame 24 extends in a seatback height direction in a side portion 18A on an inside, in a vehicle width direction (i.e., vehicle inside), of the seatback 18 (i.e., a seatback inner side portion). The outer side frame 26 extends in a seatback height direction, in a side portion 18B on an outside, in a vehicle width direction (i.e., vehicle outside), of the seatback 18 (i.e., a seatback outer side portion). The upper frame 28 connects an upper end portion of the inner side frame 24 to an upper end portion of the outer side frame 26 in the seat width direction. A lower end portion of the inner side frame 24 and a lower end portion of the outer side frame 26 are connected to a rear end portion of a seat cushion frame, not shown, that is a frame member of the seat cushion 16.

The far-side airbag device 14 is a device for protecting an occupant on a side opposite a collision side, in a side collision of a vehicle. This far-side airbag device 14 mainly includes a far-side airbag 30 (hereinafter, simply referred to as "airbag 30"), an inflator 32 (gas generating means), and a tension tether 34 (a tension strap: a long band-shaped member). The airbag 30 is arranged in the side portion 18A on the inside, in the vehicle width direction, of the seatback 18. The inflator 32 generates gas inside the airbag 30. The tension tether 34 extends between the airbag 30 and the seatback frame 22. Hereinafter, each structural member will be described in detail.

The airbag 30 is integrated (forms a single unit) with the inflator 32 and the tension tether 34, and is arranged (i.e., stored) inside the side portion 18A in a state folded up with the tension tether 34. This airbag 30 inflates and deploys forward of the seat and upward (i.e., toward the inside, in the vehicle width direction, of the occupant P) from the side portion 18A by the pressure of the gas generated by the inflator 32 (see FIGS. 1 to 4). The front, rear, up, and down directions of the airbag 30 described in the description below are not particularly limited, and indicate directions when the airbag 30 is in an inflated and deployed state. These directions substantially match the front, rear, up, and down directions of the vehicle.

This airbag 30 is formed in a bag shape by one or a plurality of sheets of base fabric, which are formed cut out of nylon or polyester cloth, for example, that are sewn together. The manufacturing method of the airbag 30 is not limited to sewing. For example, a side airbag may also be manufactured according to a so-called One Piece Woven (OPW) construction method by an automatic loom.

Figure 2:
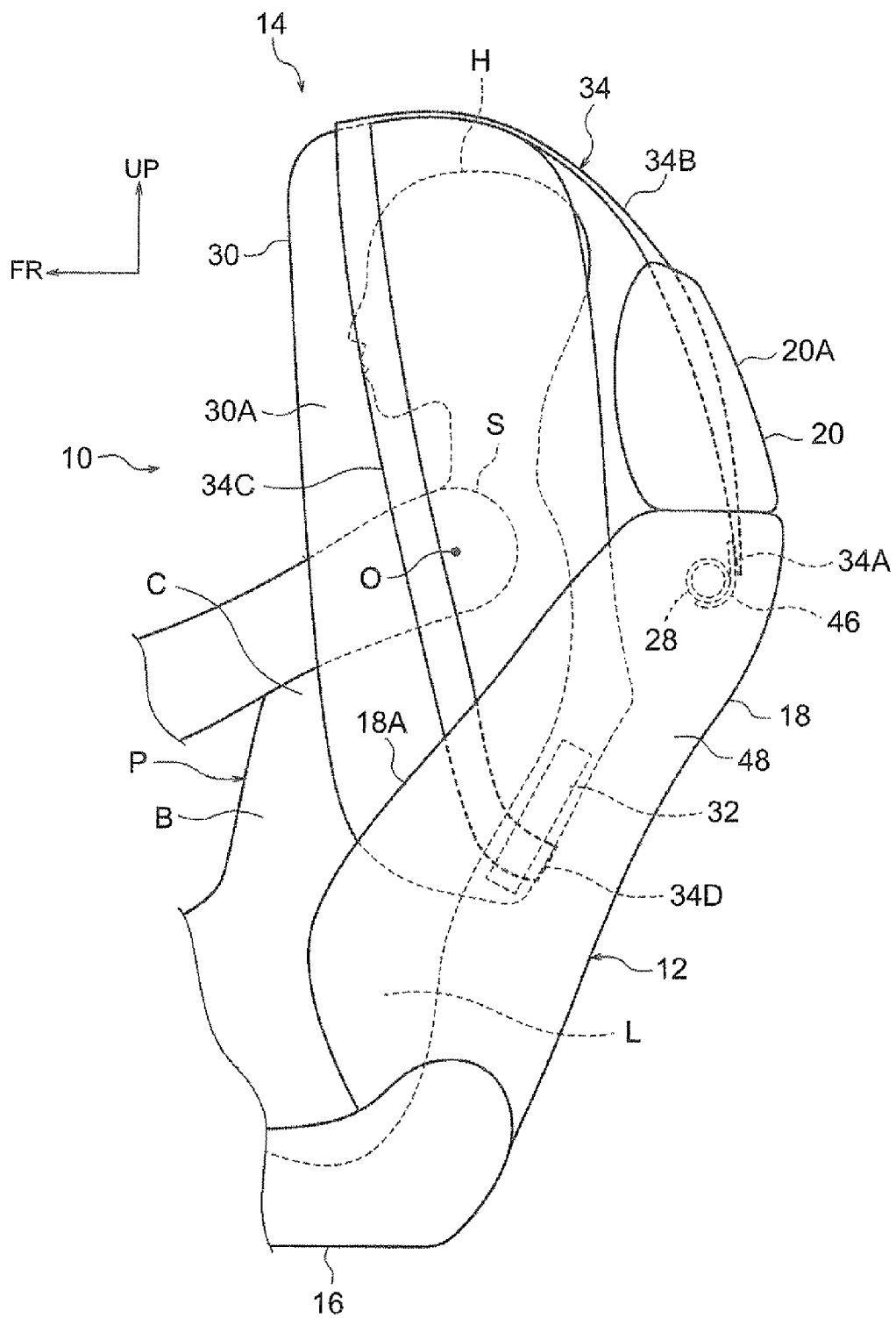
FIG. 2 is a side view of the structure of main portions of the vehicle safety device according to the first example embodiment, viewed from an inside in a vehicle width direction.

This airbag 30 is formed so as to form a long generally rectangular shape (a generally oval shape) in the vehicle vertical direction when the airbag 30 in the inflated and deployed state is viewed from the side as shown in FIG. 2, and is formed of a size that enables at least the head H, shoulders S, and chest C of the occupant P to be restrained.

Figure 5:
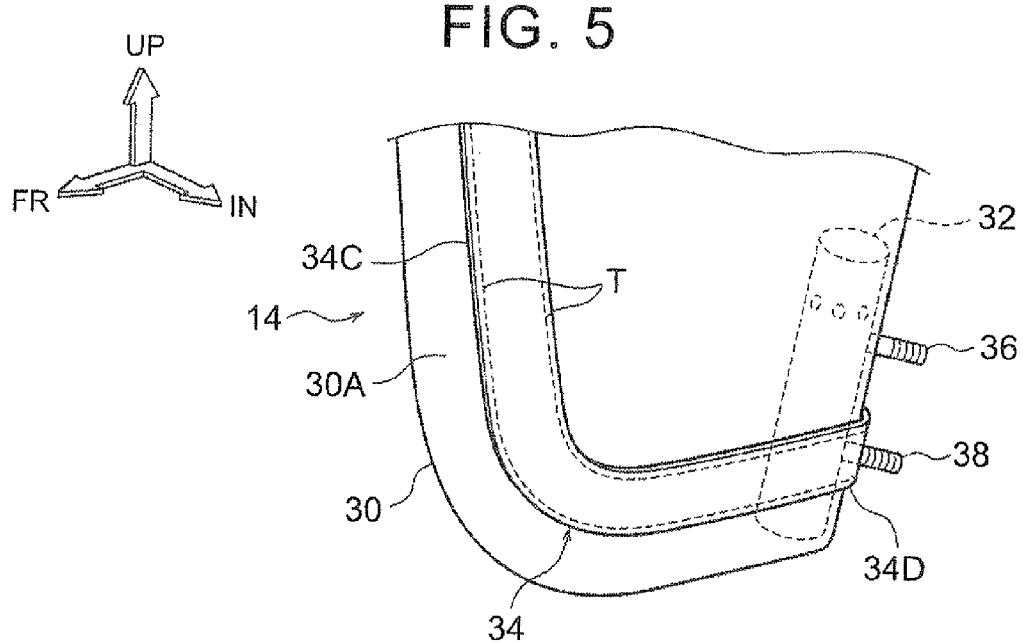
FIG. 5 is a perspective view of a part of the structure of a far-side airbag provided in the vehicle safety device according to the first example embodiment.
Figure 6:
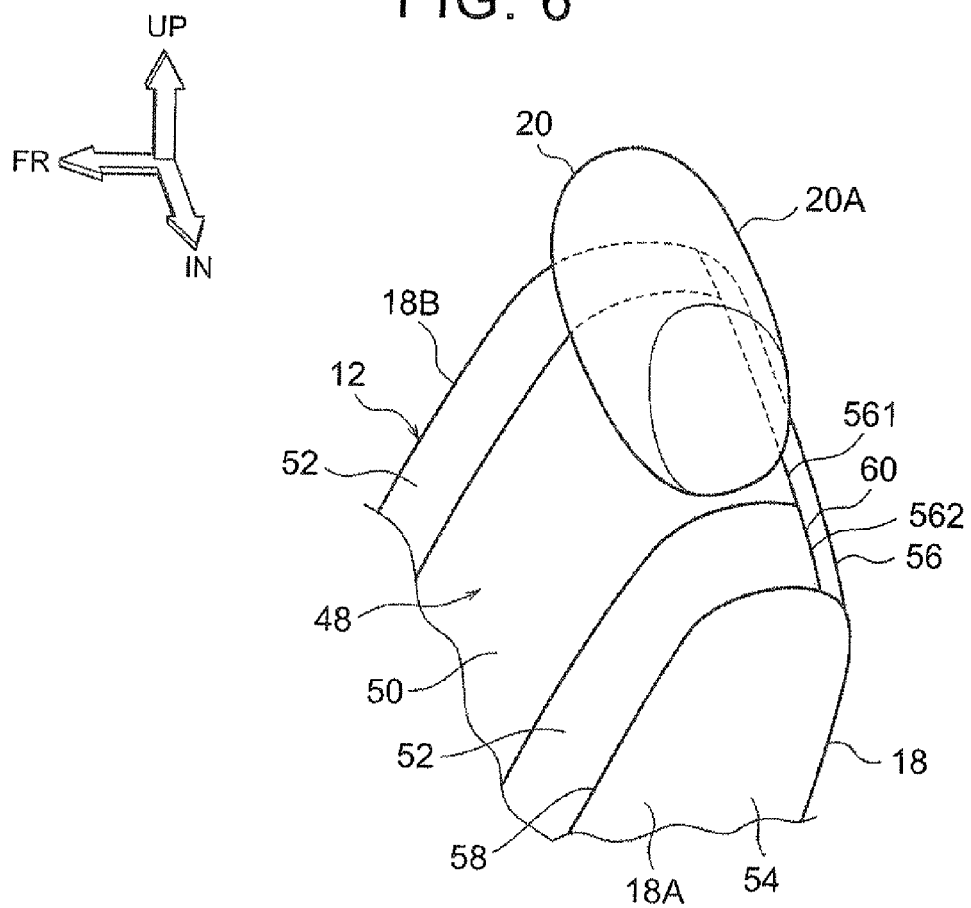
FIG. 6 is a perspective view of the structures of a headrest and an upper portion of a seatback of a vehicle seat provided in the vehicle safety device according to the first example embodiment.

The inflator 32 is a so-called cylinder type inflator and is housed on a rear end portion side of a lower end portion inside the airbag 30, as shown in FIGS. 1, 2, and 5. This inflator 32 is formed in a cylindrical shape, and is arranged with an axial direction along the height direction of the seatback 18. A pair of upper and lower stud bolts 36 and 38 (see FIG. 5) protrude out toward the rear of the seat from an outer peripheral portion of the inflator 32. These stud bolts 36 and 38 pass through the base cloth of the airbag 30 and the inner side frame 24 of the seatback frame 22, and a nut, not shown, is screwed onto a tip end side of each bolt 36 and 38. As a result, the inflator 32 is fastened and fixed to both the airbag 30 and the inner side frame 24.

A side collision ECU 40 mounted in the vehicle is electrically connected to the inflator 32 described above. A side collision sensor 42 that detects a side collision of the vehicle is electrically connected to this side collision ECU 40. The side collision ECU 40 and the side collision sensor 42 are structural members of the far-side airbag device 14.

The side collision ECU 40 is configured to activate the inflator 32 when a side collision of the vehicle is detected (i.e., when it is predicted that a side collision of vehicle is unavoidable) based on a signal from the side collision sensor 42. The far-side airbag device 14 according to this example embodiment is mounted in the vehicle seat 12 that is a driver's seat of a right-hand drive vehicle. Therefore, the inflator 32 is activated when the side collision ECU 40 detects that another vehicle or the like has impacted a side portion on the front passenger seat side of the vehicle (i.e., a left side portion). When a pre-crash sensor that anticipates (predicts) a side collision is electrically connected to the side collision ECU 40, the inflator 32 may be configured to activate when the side collision ECU 40 anticipates a side collision based on a signal from the pre-crash sensor.

When the inflator 32 is activated, gas from a gas ejection port provided in an upper portion of the inflator 32 is ejected, and the gas is supplied into the airbag 30. As a result, the airbag 30 inflates and deploys toward the inside, in the vehicle width direction, with respect to the occupant P.

Meanwhile, the tension tether 34 is formed in a long band shape by material that is flexible and does not easily stretch. A first longitudinal end portion 34A of the tension tether 34 is fixed to a bracket 46 provided on a portion (a predetermined portion) of the upper frame 28 (i.e., an upper end portion of the seatback frame 22), that is farther to the vehicle outside than the headrest 20. This bracket 46 is fixed to the upper frame 28 by means such as welding, for example, and the first longitudinal end portion 34A of the tension tether 34 is fixed to the bracket 46 by a fastener such as a nut and a bolt, not shown, for example. The method by which the first longitudinal end portion 34A is fixed to the upper frame 28 is not limited that the method described above, and may be modified as appropriate.

Also, the tension tether 34 includes a first longitudinal main portion 34B and a second longitudinal main portion 34C. The first longitudinal main portion 34B is adjacent to the first longitudinal end portion 34A, and the second longitudinal main portion 34C is adjacent to a second longitudinal end portion 34D. The second longitudinal main portion 34C of the tension tether 34 is connected by sewing to an inside surface 30A of the airbag 30, i.e., to a surface of the airbag 30 that faces the inside in the vehicle width direction when the airbag 30 is in the inflated and deployed state (see the sewn portion T in FIG. 5). The method by which the tension tether 34 is connected (fixed) to the airbag 30 is not limited to the method described above, i.e., another method such as adhesion or heat welding may also be used. Further, the stud bolt 38 on the lower side of the inflator 32 passes through the second longitudinal end portion 34D of the tension tether 34, and the second longitudinal end portion 34D of the tension tether 34 is sandwiched between the inflator 32 and the inner side frame 24. As a result, the second longitudinal end portion 34D of the tension tether 34 is fixed to both the inflator 32 and the inner side frame 24.

Here, when the airbag 30 is in the inflated and deployed state, the first longitudinal main portion 34B of the tension tether 34 extends upward from a portion of the upper end portion of the seatback frame 22, that is farther on the vehicle outside than the headrest 20, and hooks around the headrest 20 from behind the seat, and extends from an upper surface of the headrest 20 toward an upper surface of the airbag 30, as shown in FIGS. 1 to 4. Also, the second longitudinal main portion 34C of the tension tether 34 passes to the vehicle inside, in the vehicle width direction, of the airbag 30 and extends toward the inner side frame 24. Also, the second longitudinal main portion 34C is sewn to the airbag 30, and extends substantially vertically from an upper end portion to a lower end portion of the airbag 30.

When the airbag in the inflated and deployed state is viewed from the seat width direction (here, the inside in the vehicle width direction), the second longitudinal main portion 34C of the tension tether 34 (i.e., a portion positioned to the vehicle inside with respect to the airbag 30) extends vertically, passing, through a position farther in front of the seat than the center O of the shoulders S of the occupant P, as shown in FIG. 2. The position of the center O may be a position of the axial center of a bolt provided in a shoulder of the WorldSID, for example.

Also, in this example embodiment, before the airbag 30 is inflated and deployed, the airbag 30 and the tension tether 34 are covered by a cover 48 of the seatback 18. This cover 48 is formed by a plurality of covers including a front cover 50, a pair of left and right front side covers 52, a pair of left and right side covers 54 (the side cover 54 on the outside in the vehicle width direction is not shown in FIG. 6), and a rear cover 56, all of which are sewn together.

The sewn portion of the side cover 54 and the front side cover 52 on the inside in the vehicle width direction serves as a first tear sewn portion 58 (tear seam). Also, the sewn portion of respective upper end edge portions of the front cover 50, the rear cover 56, and the left and right front side covers 52 serves as a second tear sewn portion 60 (tear seam). Specifically, the upper end edge portion of the rear cover 56 is formed by a first rear upper end edge portion 561 and second rear upper end edge portions 562. Then, the second tear sewn portion 60 is constituted by a sewn portion of the upper end edge portion of the front cover 50 and the first rear upper end edge portion 561, and sewn portions of the second rear upper end edge portions 562 and upper end edge portions of the left and right front side covers 52. An end portion on the inside, in the vehicle width direction, of the first tear sewn portion 58 is continuous with an upper end portion of the second tear sewn portion 60.

The first tear sewn portion 58 extends in the height direction of the seatback, along a front end edge portion of the side portion 18A. This first tear sewn portion 58 tears by the inflation pressure of the airbag 30 when the airbag 30 inflates and deploys. Accordingly, an opening for inflating and deploying the airbag 30 toward the outside of the seatback 18 is formed. Also, the second tear sewn portion 60 extends in the seat width direction, along a seat rear edge portion of an upper end portion of the seatback 18. This second tear sewn portion 60 tears by the force of the tension tether 34 that expands along with the inflation and deployment of the airbag 30 when the airbag 30 inflates and deploys. Accordingly, an opening for pulling the tension tether 34 toward the outside of the seatback 18 is formed. Also, the tension tether 34 that has been pulled toward the outside of the seatback 18 is configured to slide upward along the rear surface 20A of the headrest 20.

Next, the operation and effects of the first example embodiment will be described.

With the vehicle safety device 10 having the structure described above, the inflator 32 is activated by the side collision ECU 40 when the side collision ECU 40 detects a side collision of the vehicle based on a signal from the side collision sensor 42. When this happens, gas ejected from the inflator 32 is supplied into the airbag 30, and the airbag 30 consequently inflates and deploys forward and upward with respect to the seat from the side portion 18A of the seatback 18, and protrudes higher than the headrest 20. The tension tether 34 in which the both longitudinal end portions 34A and 34D of the tension tether 34 are connected to the seatback frame 22 is connected to this airbag 30 that faces the head H, shoulders S, and chest C of the occupant P from the inside in the vehicle width direction. Thus, while the airbag 30 is in the inflated and deployed state, this tension tether 34 extends upward from a portion of an upper end portion (i.e., the upper frame 28) of the seatback frame 22 and hooks around the headrest 20 from behind the seat. Also, the tension tether 34 extends from the upper surface of the headrest 20 toward the upper surface of the airbag 30, passes to the vehicle inside, in the vehicle width direction of the airbag 30 and extends toward the seatback frame 22. Here, the portion of the upper frame 28 described above is farther to the vehicle outside than the headrest 20.

Therefore, when the occupant P strikes the airbag 30 due to the impact of a side collision, the airbag 30 is supported from the inside in the vehicle width direction, by the tension tether 34 of which a portion is hooked around the headrest 20. Thus, the airbag 30 able to be is inhibited from moving toward the inside in the vehicle width direction by a load from the occupant P. Moreover, because the airbag 30 that protrudes higher than the headrest 20 is inhibited from moving toward the inside in the vehicle width direction by the tension tether 34, the head H of the occupant P is able to be effectively inhibited from moving toward the inside in the vehicle width direction by the airbag 30.

Furthermore, in this example embodiment, the tension tether 34 extends in the manner described above when the airbag 30 is in the inflated and deployed state, so the occupant P is less likely to contact the tension tether 34 when the airbag 30 inflates and deploys. Accordingly, it is possible to prevent the deployment direction of the airbag 30 from unexpectedly bending due to pull force from the tension tether 34, so the deployment direction of the airbag 30 can be stabilized, and as a result, good occupant restraint performance is able to be provided by the airbag 30.

Also, in this example embodiment, the tension tether 34 that is connected to the airbag 30 slides upward along the rear surface 20A of the headrest 20 when the airbag 30 protrudes higher than the headrest 20 by inflating and deploying. The rear surface 20A of the headrest 20 curves toward the front of the seat higher up, so the tension tether 34 is able to slide up smoothly to the upper surface of the headrest 20.

Moreover, in this example embodiment, when the airbag 30 is in the inflated and deployed state, the second longitudinal main portion 34C of the tension tether 34 extends vertically, passing through a position farther in front of the seat than the center O of the shoulders S of the occupant P when viewed from the seat width direction. Therefore, the shoulder S of the occupant P that strikes the airbag 30 from impact of a side collision is able to be well supported by the tension tether 34 via the airbag 30. As a result, the head H is able to be effectively inhibited from moving toward the inside in the vehicle width direction.

Also, in this example embodiment, the second longitudinal end portion 34D of the tension tether 34 is fixed to both the inflator 32 and the inner side frame 24. This (i.e., the fixing) can be accomplished using a nut and the stud bolt 38 for fixing the inflator 32 to the seatback frame 22, so the tension tether 34 is able to be easily fixed to the seatback frame 22 by a simple structure.

Furthermore, in this example embodiment, before the airbag 30 inflates and deploys, the airbag 30 and the tension tether 34 are covered by the cover 48 of the seatback 18. Also, when the airbag 30 inflates and deploys, the first tear sewn portion 58 provided on the cover 48 tears by the inflation pressure of the airbag 30, and the second tear sewn portion 60 tears by the force of the tension tether 34. Therefore, the tension tether 34 that is normally covered by the cover 48 is able to be pulled out toward the outside of the seatback 18 by the tear in the second tear sewn portion 60. This second tear sewn portion 60 is provided along the seat rear edge portion of the upper end portion of the seatback 18, so the tension tether 34 that is pulled out as described above is able to be better induced toward the rear surface 20A of the headrest 20.

Hereinafter, a supplemental description of the first example embodiment will be given. In the first example embodiment, a structure is described in which the headrest 20 is formed separately from the seatback 18, and then connected to the seatback 18. The example embodiment of the invention is not limited to this. That is, the headrest may also be formed integrated with (i.e., unable to be removed from) the seatback, that is, the headrest may be integrally provided on the upper end portion of the seatback.

Also, in the first example embodiment, the tension tether 34 is normally covered by the cover 48 of the seatback 18, but the invention is not limited to this. That is, a portion of the tension tether 34 may be arranged normally on the outside of the seatback 18.

Also, in the first example embodiment described above, the tension tether 34 is configured such that a portion that is positioned on the vehicle inside of the airbag 30 when the airbag 30 is in an inflated and deployed state (i.e., the second longitudinal main portion 34C: hereinafter referred to as an "inner main portion") extends vertically, passing through a position farther in front of the seat than the center O of the shoulder S of the occupant P when viewed from the seat width direction, but the example embodiment of the invention is not limited to this. That is, the position of the inner main portion of the tension tether 34 when the airbag 30 is in the inflated and deployed state may be modified as appropriate. For example, the inner main portion of the tension tether 34 may extend vertically, passing through a position that overlaps with the center of the shoulder S when viewed from the seat width direction. In this case as well, the shoulder S is able to be well restrained by the tension tether 34, so basically the same operation and effects as the first example embodiment are displayed.

Furthermore, in the first example embodiment of the invention, the rear surface 20A of the headrest 20 is curved toward the front of the seat higher Up, but the example embodiment of the invention is not limited to this. That is, the rear surface of the headrest may also be inclined toward the front of the seat higher up. Also, for example, a shape for catching the tension tether may be provided on the headrest, or the shape of the headrest may be modified as appropriate.

The supplementary description described above also applies to another example embodiment of the invention described below. In the example embodiment described below, structure and operation that is basically the same as that in the first example embodiment described above will be denoted by the same reference characters used in the first example embodiment, and descriptions of this structure and operation will be omitted.

Figure 7:
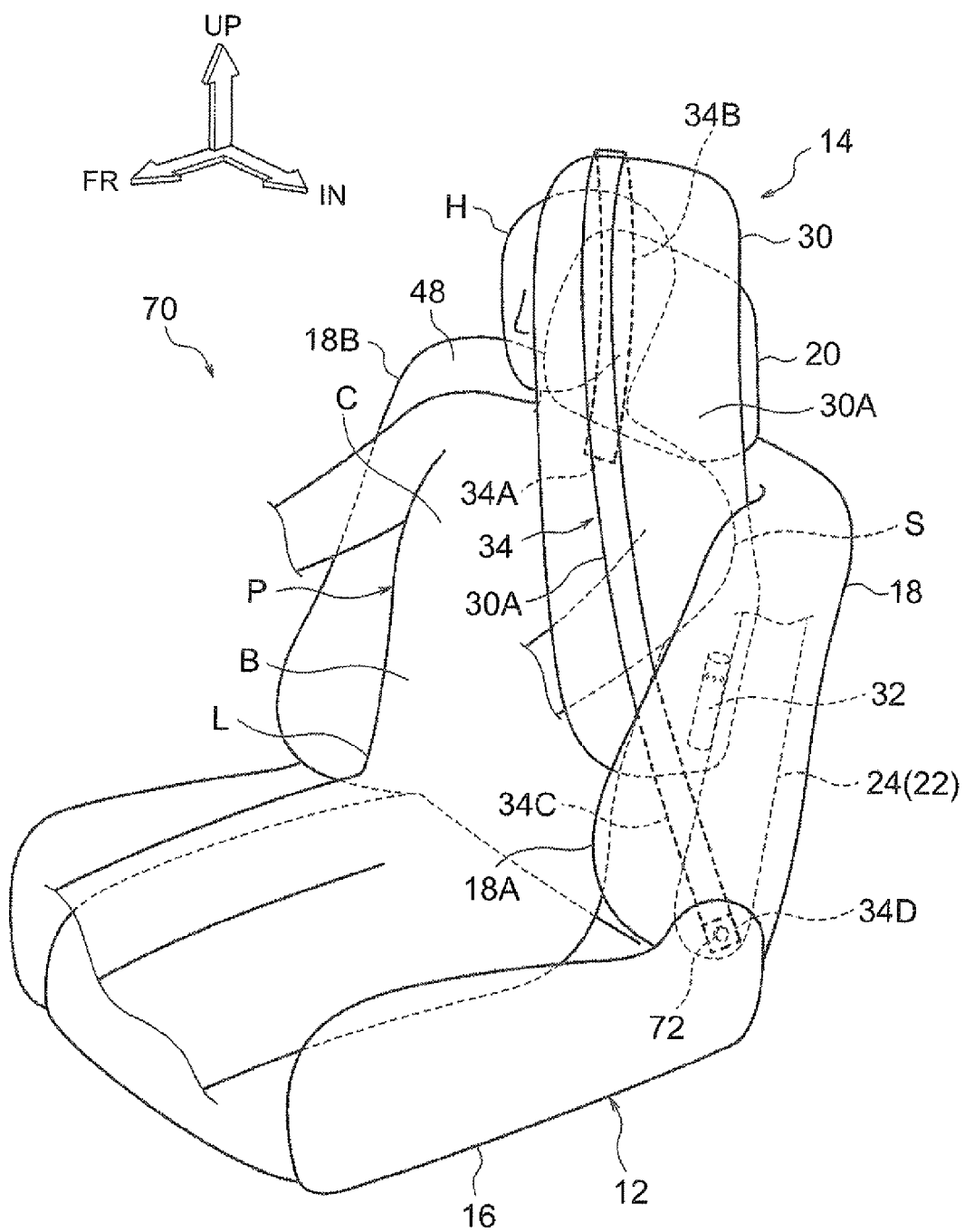
FIG. 7 is a perspective view of a vehicle safety device according to a second example embodiment of the invention.

FIG. 7 is a perspective view of the structure of a vehicle safety device 70 according to a second example embodiment of the invention. In this example embodiment, the tension tether 34 is formed longer than it is in the first example embodiment. Also, a longitudinal middle main portion 34E of the tension tether 34 that is between the first longitudinal main portion 34B and the second longitudinal main portion 34C is sewn to the inside surface 30A of the airbag 30. The longitudinal middle main portion 34E is positioned between the first longitudinal main portion 34B and the second longitudinal main portion 34C of the tension tether 34. Also, the second longitudinal min portion 34C of the tension tether 34 extends below the airbag 30, and the second longitudinal end portion 34D of the tension tether 34 is fixed to a lower end portion of the inner side frame 24 by a bolt 72 and a nut, not shown. In this example embodiment, the other structure is the same as that in the first example embodiment described above.

In this example embodiment, when the airbag 30 is in the inflated and deployed state, the second longitudinal main portion 34C of the tension tether 34 extends (is expanded) vertically between the inside surface 30A of the airbag 30 and the lower end portion of the inner side frame 24. Accordingly, the head H, shoulders S, and chest C of the occupant P are able to be supported from the inside in the vehicle width direction by the airbag 30, while the abdominal region B and lumbar region L of the occupant P are able to be supported from the inside in the vehicle width direction by the second longitudinal main portion 34C of the tension tether 34. As a result, movement of the upper body of the occupant P toward the inside in the vehicle width direction is able to be effectively inhibited, so movement of the head H toward the inside in the vehicle width direction is able to be even more effectively inhibited.

Figure 8:
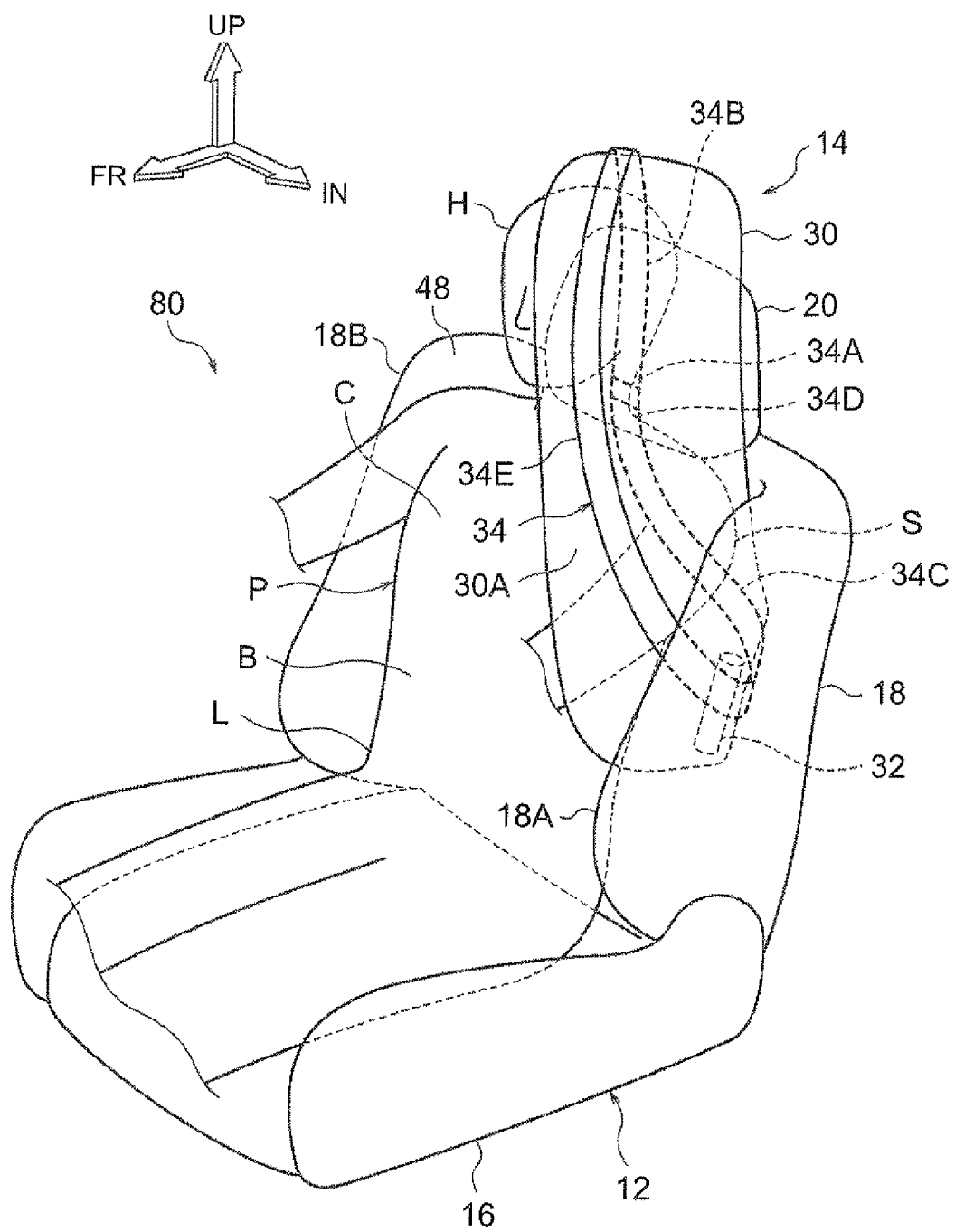
FIG. 8 is a perspective view of a vehicle safety device according to a third example embodiment of the invention.
Figure 9:
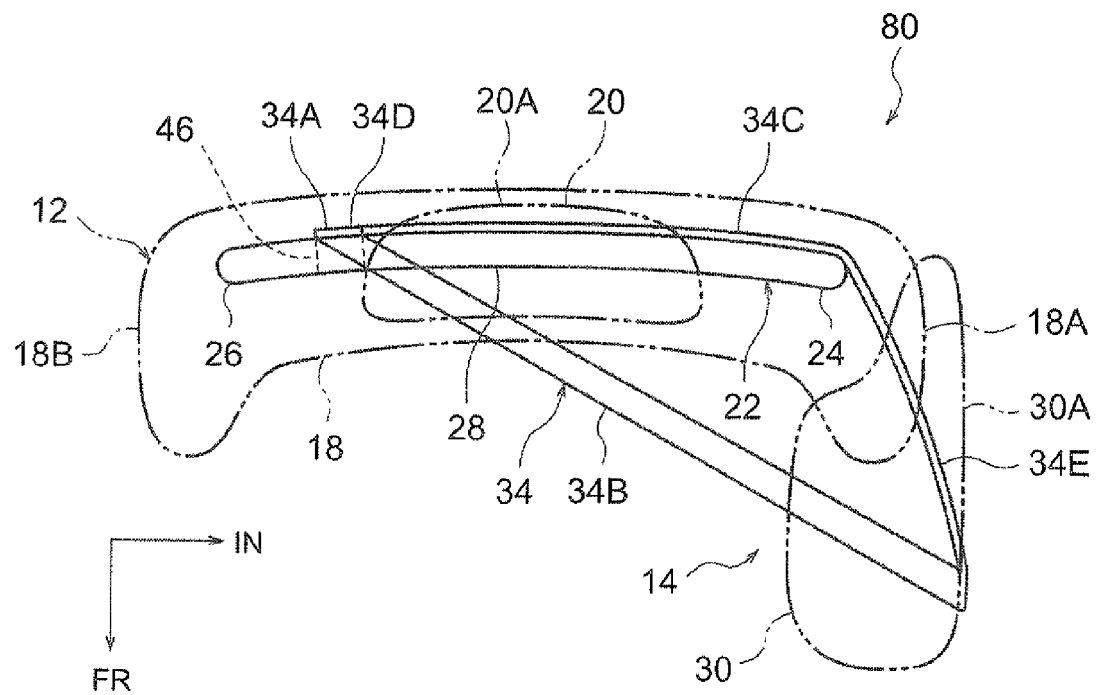
FIG. 9 is a plan view of the structure of main portions of the vehicle safety device according to the third example embodiment.
Figure 10:
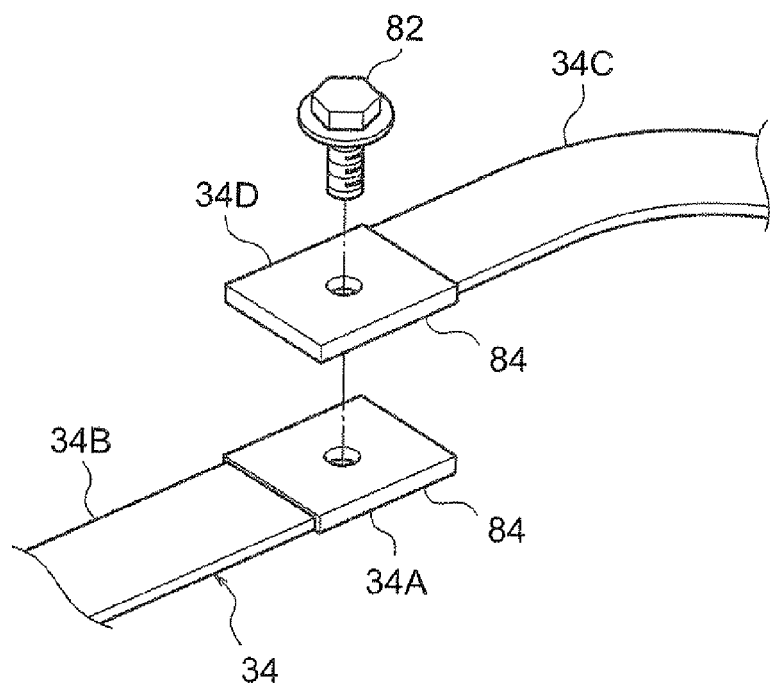
FIG. 10 is a perspective view of the structures of a first longitudinal end portion and a second longitudinal end portion of a tension tether of the vehicle safety device according to the third example embodiment.

FIG. 8 is a perspective view of the structure of a vehicle safety device 80 according to a third example embodiment of the invention. In this example embodiment, the tension tether 34 is formed longer than it is in the first example embodiment, and a longitudinal middle main portion 34E that is between the first longitudinal main portion 34B and the second longitudinal main portion 34C of the tension tether 34 is sewn to the inside surface 30A of the airbag 30. Also, the second longitudinal main portion 34C of the tension tether 34 extends to the rear of the seat from the inside surface 30A of the airbag 30, and hooks around (i.e., winds around) a rear surface of the inner side frame 24, and extends toward the outside in the vehicle width direction, as shown in FIG. 9. The second longitudinal end portion 34D of the tension tether 34 overlaps with the first longitudinal end portion 34A as shown in FIG. 10, and is fixed to the bracket 46 (not shown in FIG. 10) by a bolt 82 and a nut, not shown. A reinforcing plate 84 is attached to the first longitudinal end portion 34A and the second longitudinal end portion 34D. The other structure in this example embodiment is the same as it is in the first example embodiment described above.

In this example embodiment, the first longitudinal end portion 34A and the second longitudinal end portion 34D of the tension tether 34 are fixed to the upper frame 28 farther to the outside in the vehicle width direction than the headrest 20, and the second longitudinal main portion 34C of the tension tether 34 is hooked around the rear surface of the inner side frame 24. Therefore, tension that acts on the tension tether 34 when the occupant P strikes the airbag 30 that has inflated and deployed is able to be supported by not only the upper frame 28 but also the inner side frame 24. As a result, the strength of the seatback frame 22 is able to be effectively used, so the airbag 30 is able to be well supported via the tension tether 34. As a result, movement of the upper body of the occupant P toward the inside in the vehicle width direction is able to be effectively inhibited, so movement of the head H of the occupant P toward the inside in the vehicle width direction is able to be even more effectively inhibited.

While the invention has been described with reference to three example embodiments, the invention may also be carried out in modes that have been modified in any of a variety of ways without departing from the scope thereof.

What is claimed is:

1. A vehicle safety device comprising:
a vehicle seat in which a headrest is formed integrated with or separate from a seatback;
an inflator that is provided in the vehicle seat and generates gas by activating;
a far-side airbag arranged in a seatback inner side portion that is positioned on a vehicle inside in a vehicle width direction, the far-side airbag being configured to inflate and deploy forward and upward with respect to the vehicle seat from the seatback inner side portion by the gas being supplied into the far-side airbag, and the far-side airbag protruding higher than the headrest when the far-side airbag is in an inflated and deployed state in which the far-side airbag is inflated; and
a tension tether that is formed in a long shape and connected to the far-side airbag, a first longitudinal end portion and a second longitudinal end portion of the tension tether being connected to a seatback frame provided in the seatback, the tension tether extending upward from a predetermined portion of an upper end portion of the seatback frame and hooking around the headrest from behind the vehicle seat when the far-side airbag is in the inflated and deployed state, the predetermined portion being positioned farther on a vehicle outside in the vehicle width direction than the headrest, and the tension tether extending from an upper surface of the headrest toward an upper surface of the far-side airbag, and further extending toward the seatback frame on a vehicle inside, in the vehicle width direction, with respect to the far-side airbag, when the far-side airbag is in the inflated and deployed state.

2. The vehicle safety device according to claim 1, wherein a rear surface of the headrest is inclined or curved toward a front of the vehicle seat higher up; and
the tension tether is configured to slide upward along the rear surface of the headrest when the far-side airbag inflates and deploys.

3. The vehicle safety device according to claim 1, wherein when the far-side airbag is in the inflated and deployed state, a portion of the tension tether that is positioned on the vehicle inside, in the vehicle width direction, with respect to the far-side airbag passes through a position that overlaps with a center of a shoulder of an occupant seated in the vehicle seat or a position that is farther in front of the vehicle seat than the center, when viewed from the vehicle width direction.

4. The vehicle safety device according to claim 1, wherein when the far-side airbag is in the inflated and deployed state and a world side impact dummy is seated in the vehicle seat, a portion of the tension tether that is positioned on the vehicle inside, in the vehicle width direction, with respect to the far-side airbag passes through a position that overlaps with a center of a shoulder of the world side impact dummy or a position that is farther in front of the vehicle seat than the center, when viewed from the vehicle width direction.

5. The vehicle safety device according to claim 1, wherein the first longitudinal end portion is fixed to the predetermined portion; and
the second longitudinal end portion is fixed to the inflator and the seatback frame at the seatback inner side portion.

6. The vehicle safety device according to claim 5, further comprising
a fastener that is configured to fix the inflator to the seatback frame,
wherein the second longitudinal end portion is fixed to the seatback frame by the fastener.

7. The vehicle safety device according to claim 1, wherein
the first longitudinal end portion is fixed to the predetermined portion; and
the second longitudinal end portion is fixed to a lower end portion of the seatback frame at the seatback inner side portion.

8. The vehicle safety device according to claim 7, wherein
the tension tether is constituted by the first longitudinal end portion, the second longitudinal end portion, a first longitudinal main portion, a second longitudinal main portion and a longitudinal middle main portion,
the first longitudinal main portion is adjacent to the first longitudinal end portion,
the second longitudinal main portion is adjacent to the second longitudinal end portion,
the longitudinal middle main portion is positioned between the first longitudinal main portion and the second longitudinal main portion, and
the longitudinal middle main portion is connected by sewing to an inside surface of the far-side airbag, the inside surface being positioned on the vehicle inside in the vehicle width direction.

9. The vehicle safety device according to claim 7, wherein
the seatback frame includes an inner side frame, an outer side frame, and an upper frame,
the inner side frame extends in a seatback height direction in the seatback inner side portion,
the outer side frame extends in a seatback height direction, in a seatback outer side portion, the seatback outer side portion being positioned on a vehicle outside in the vehicle width direction,
the upper frame connects an upper end portion of the inner side frame to an upper end portion of the outer side frame in the vehicle width direction, and
the second longitudinal end portion is fixed to a lower end portion of the inner side frame by a fastener.

10. The vehicle safety device according to claim 1, wherein
the first longitudinal end portion is fixed to the predetermined portion;
a longitudinal main portion of the tension tether extends toward a rear of the vehicle seat from the vehicle inside with respect to the far-side airbag in the vehicle width direction, and is hooked around a rear surface of the seatback frame, and extends toward a vehicle outside in the vehicle width direction; and
the second longitudinal end portion is fixed to the first longitudinal end portion and the seatback frame.

11. The vehicle safety device according to claim 10, wherein
the longitudinal main portion is constituted by a first longitudinal main portion, a second longitudinal main portion and a longitudinal middle main portion,
the longitudinal middle main portion is positioned between the first longitudinal main portion and the second longitudinal main portion, and
the longitudinal middle main portion is connected by sewing to an inside surface of the far-side airbag, the inside surface being positioned on the vehicle inside in the vehicle width direction.

12. The vehicle safety device according to claim 1, wherein
before the far-side airbag inflates and deploys, the far-side airbag and the tension tether are covered by a cover of the seatback;
a first tear sewn portion along a front edge portion of the seatback inner side portion and a second tear sewn portion along a rear edge portion of an upper end portion of the seatback are provided on the cover;
the first tear sewn portion is configured to tear by an inflation pressure of the far-side airbag when the far-side airbag inflates and deploys; and
the second tear sewn portion is configured to tear by force from the tension tether when the far-side airbag inflates and deploys.

13. The vehicle safety device according to claim 12, wherein
the cover is formed by a front cover, front side covers that are adjacent to both sides of the front cover in the vehicle width direction, side covers that are adjacent the front side covers, and a rear cover that is adjacent to the side covers, all being sewn together;
an upper end edge portion of the rear cover is formed by a first rear upper end edge portion and second rear upper end edge portions; and
the first tear sewn portion is a sewn portion of one of the front side covers and a corresponding one of the side covers, and
the second tear sewn portion is a sewn portion of an upper end edge portion of the front cover and the first rear upper end edge portion, and sewn portions of the second rear upper end edge portions and upper end edge portions of the front side covers.

14. The vehicle safety device according to claim 1, further comprising
a bracket that is provided on the predetermined portion, wherein
the first longitudinal end portion is fixed to the bracket.

15. The vehicle safety device according to claim 1, wherein
the tension tether is constituted by the first longitudinal end portion, the second longitudinal end portion, a first longitudinal main portion and a second longitudinal main portion,
the first longitudinal main portion is adjacent to the first longitudinal end portion,
the second longitudinal main portion is adjacent to the second longitudinal end portion, and
the second longitudinal main portion is connected by sewing to an inside surface of the far-side airbag, the inside surface being positioned on the vehicle inside in the vehicle width direction.

* * * * *